United States Patent
Stark et al.

(10) Patent No.: US 6,919,033 B2
(45) Date of Patent: Jul. 19, 2005

(54) STORMWATER TREATMENT SYSTEM FOR ELIMINATING SOLID DEBRIS

(75) Inventors: John G. Stark, Williamsville, NY (US); Thomas Fleischanderl, Gaspolshofen (AT); Hannes Brandstaetter, Gaspolshofen (AT)

(73) Assignee: Royal Environmental Systems, Inc., Stacy, MN (US)

( * ) Notice: Subject to any disclaimer, the term of this patent is extended or adjusted under 35 U.S.C. 154(b) by 107 days.

(21) Appl. No.: 10/685,146

(22) Filed: Oct. 13, 2003

(65) Prior Publication Data

US 2005/0077248 A1 Apr. 14, 2005

(51) Int. Cl.$^7$ ............................................. B01D 21/02
(52) U.S. Cl. .................. 210/787; 210/801; 210/512.1; 210/519; 210/521; 210/532.1; 210/538
(58) Field of Search ......................... 210/512.1, 519, 210/521, 522, 532.1, 538, 546, 800, 801, 787

(56) References Cited

U.S. PATENT DOCUMENTS

| | | | |
|---|---|---|---|
| 1,748,541 A | * | 2/1930 | Davitt et al. ................. 210/540 |
| 2,846,073 A | * | 8/1958 | Hopper, Sr. ................... 210/540 |
| 3,856,682 A | * | 12/1974 | Summers ...................... 210/540 |
| 3,965,013 A | * | 6/1976 | Jackson ....................... 210/519 |
| 4,219,428 A | * | 8/1980 | Soderstroom ................ 210/522 |
| 4,684,467 A | * | 8/1987 | Cloud .......................... 210/519 |
| 4,747,962 A | | 5/1988 | Smisson |
| 4,985,148 A | * | 1/1991 | Monteith ...................... 210/519 |
| 5,437,786 A | | 8/1995 | Horsley et al. |
| 5,549,817 A | | 8/1996 | Horsley et al. |
| 5,575,909 A | * | 11/1996 | Foster ....................... 210/532.1 |
| 5,702,593 A | | 12/1997 | Horsley et al. |
| 5,707,527 A | | 1/1998 | Knutson et al. |
| 5,759,415 A | * | 6/1998 | Adams ........................ 210/521 |
| 5,954,952 A | | 9/1999 | Straser, Sr. |
| 6,068,765 A | | 5/2000 | Monteith |
| 6,096,200 A | | 8/2000 | Bennett |
| 6,120,684 A | | 9/2000 | Kistner et al. |
| 6,171,507 B1 | | 1/2001 | Roy et al. |
| 6,241,881 B1 | | 6/2001 | Pezzaniti |
| 6,350,374 B1 | | 2/2002 | Stever et al. |
| 6,379,541 B1 | | 4/2002 | Nicholas |
| 6,406,218 B1 | | 6/2002 | Olson |
| 2004/0055950 A1 | * | 3/2004 | Bryant ...................... 210/532.1 |

\* cited by examiner

*Primary Examiner*—Christopher Upton
(74) *Attorney, Agent, or Firm*—Nikolai & Mersereau, P.A.; Thomas J. Nikolai

(57) ABSTRACT

A stormwater treatment system designed to separate floating pollutants, liter, and contaminated settling solids from drainage discharge. The system uses a cylindrical tank, buried below the ground, which enables separation of the pollutants. The stormwater flows around the inside perimeter of the tank until it flows into an inner cylinder through a weir (or weirs). This causes a delayed flow due to the limited entry point through the vertical weir. The extended amount of resonance time allows for separation of pollutants, liter, and contaminated solids. The stormwater continues to separate itself as it flows around the inner cylinder, up through a vertical pipe and out an outlet pipe. The solid contaminants which are left behind are stored and able to be removed later.

8 Claims, 10 Drawing Sheets

STORMWATER TREATMENT SYSTEM FOR ELIMINATING SOLID DEBRIS

BACKGROUND OF THE INVENTION

I. Field of the Invention

This invention relates generally to a stormwater treatment system, and more particularly a stormwater treatment system for separating floating pollutants, liter and contaminated settling solids from stormwater drainage discharge.

II. Discussion of the Prior Art

It is well known that there have been a number of drainage structures designed to collect stormwater runoff and to separate pollutants from the runoff water. Some use media absorption and filtration, others use screens, and still others use gravitational separation.

Each method and design is somewhat unique, but none has the present invention's configuration or ability operate efficiently at such a wide range of storm conditions.

SUMMARY OF THE INVENTION

The present invention provides for a stormwater treatment apparatus adapted to be buried underground and receive stormwater from sewer grates at ground level. The assembly includes a large outer cylindrical tank buried below the surface. An inlet pipe extends through this cylindrical tank and directs stormwater into the system. Within the cylindrical tank is an inner cylindrical wall protruding upward from the tank's bottom surface. The inner cylindrical wall contains a vertical weir through which stormwater can enter. Inside this cylindrical wall is a vertical pipe, open at both of its ends. A horizontal outlet pipe supports the vertical pipe and joins it in a perpendicular or "Tee" connection.

Stormwater generally flows down into the inlet pipe from storm grates at ground level. The inlet pipe passes through the side wall of the cylindrical tank and has a 90° elbow for directing flow in a circular path. The stormwater circulates around in the annular space between the inside wall of the outer tank and the outside wall of the inner cylindrical tank until it spills into the inner cylindrical tank through its weir (or weirs). This process causes a delayed flow due to the limited entry point through the vertical weir. The extended amount of residence time allows for separation of pollutants, liter, and contaminated solids. The stormwater continues to separate itself from non-floating debris as it flows into the inner cylinder, up through the vertical pipe and out the outlet pipe. The solid pollutants left behind are stored and able to be removed later as needed by a clean-out crew.

These and other objects, features, and advantages of the present invention will become readily apparent to those skilled in the art through a review of the following detailed description in conjunction with the claims and accompanying drawings in which like numerals in several views refer to the same corresponding parts.

DESCRIPTION OF THE PREFERRED EMBODIMENT

The present invention represents broadly applicable improvements for stormwater treatment system design for separating floating pollutants, liter and contaminated settling solids from stormwater drainage discharge. The embodiments herein are intended to be taken as representative of those in which the invention may be incorporated and are not intended to be limiting.

Figure 1:
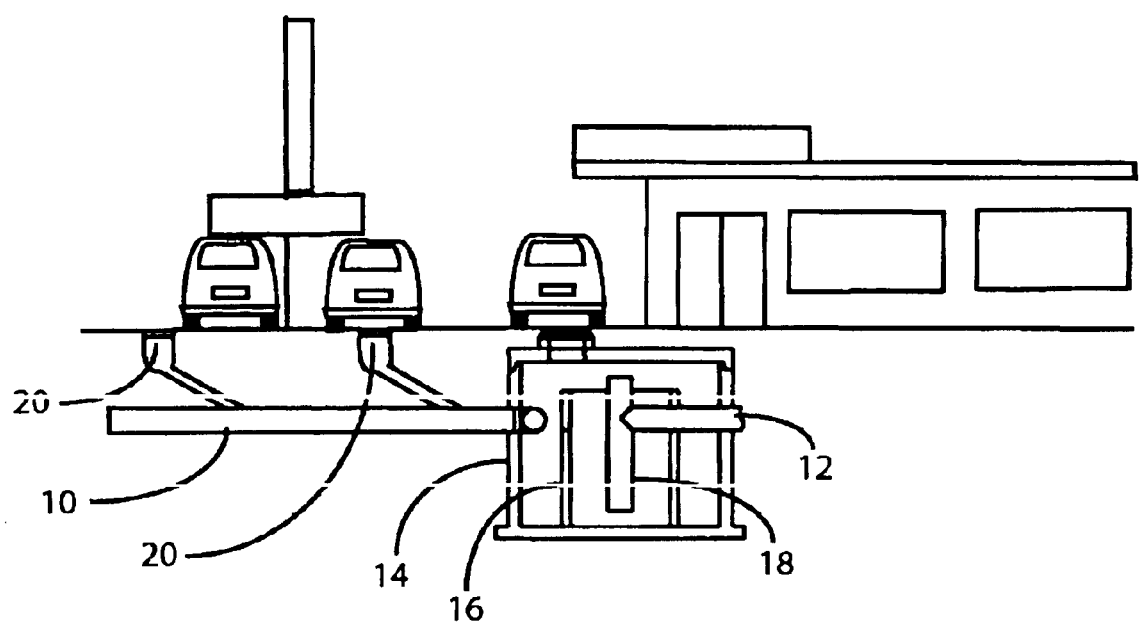
FIG. 1 is a pictorial of the stormwater treatment system of the present invention.

Referring first to FIG. 1 shown is a side view above and below ground of the stormwater treatment system. The system is generally made up of inlet pipe 10, outlet pipe 12, outer tank 14, inner tank 16, and vertical pipe 18. Also disclosed in this figure are several storm sewer grates 20 with pipes leading to the system inlet pipe 10. Rainfall and stormwater enter through these storm sewer grates 20, funnel into the inlet pipe 10, and pass through the treatment system of the present invention.

Figure 2:
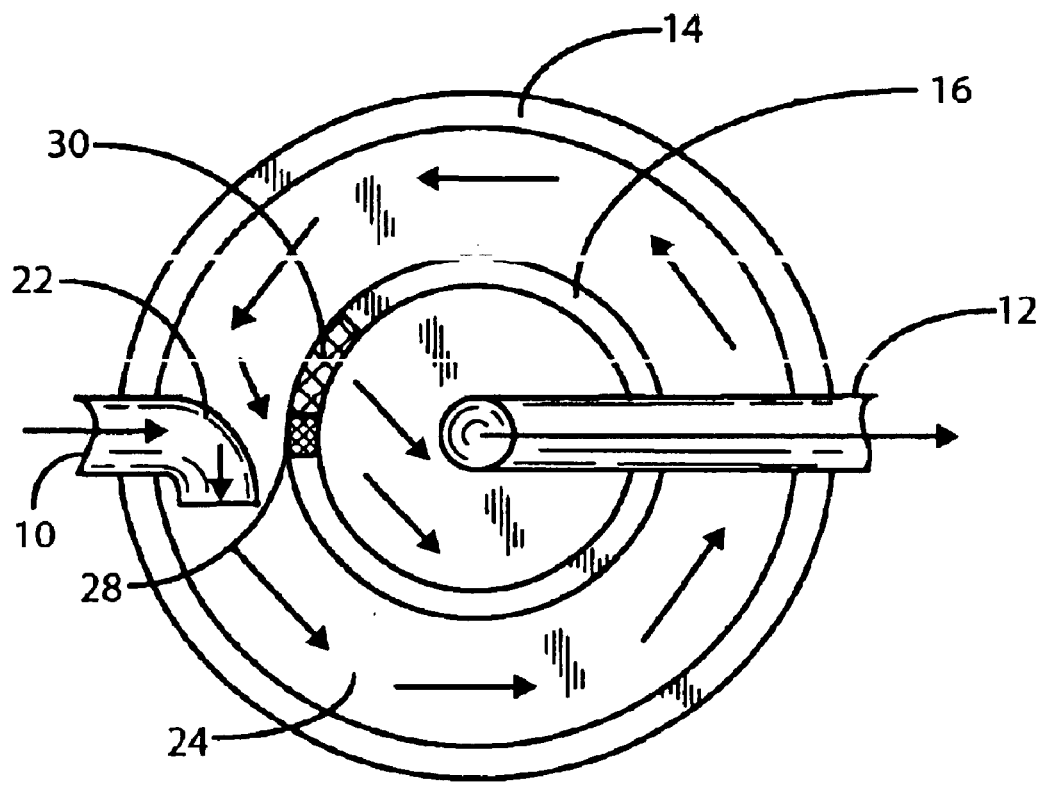
FIG. 2 is a top view of the stormwater treatment system of the present invention.

With reference to FIG. 2, a top view of the treatment system is shown. This figure discloses a standard cement or tile inlet pipe 10 where stormwater enters the outer tank. The end of the inlet pipe 10 has an elbow 22 angled at either 45 or 90 degrees along the horizontal plane. This elbow 22 is important because it initiates a counter clock wise, circular flow of stormwater passing through the system. Stormwater largely flows in a chamber 24 between the inner wall of the outer tank 14 and the outer wall of the inner tank 16 as it first enters the treatment system. The circular flow is laminar and enables solids to separate from the stormwater by settling to the bottom of the tank in outer chamber 24.

The inner tank 16 is concentrically aligned with the wall of the outer tank 14. Inner tank 16 has a cylindrical wall and a diameter approximately half that of the outer tank 14. The inner tank wall is sealed to the bottom wall 26 (see FIG. 3) and extends upward to more than three-quarters the height of outer tank wall 14. The top of the inner tank wall has no covering and remains open.

The inner tank wall 16 has a vertical weir opening 28. Weir opening 28 is a narrow vertical slot formed through the wall and extends down from the top edge of the inner tank wall 16. The slot stretches to a level approximately aligned with the bottom edge of the inlet pipe 10. Under most conditions, this vertical weir opening 28 is the entry passage for stormwater as it flows from the outside tank inward. Due to both the circular laminar flow and the limited entry point through the vertical weir 28, there is an extended amount of residence time allowing for separation by settling of pollutants, liter, and contaminated solids. To aid the entry process into cylindrical inner tank 16, some applications may also utilize a horizontal weir 30. Horizontal weir 30 is a short horizontal slit through the wall. It extends approximately one-eighth of the distance around the circumference of the inner cylindrical wall 16.

Referring again to FIG. 3, the cylindrical inner tank 16 is disclosed as well as vertical weir 28 and horizontal weir 30. Within the inner tank is an area referred to as inner chamber 32. Generally, stormwater flows from outer chamber 24, either through the weirs 28 and 30 or over the top of inner tank wall 16, and into the inner chamber 32. Concentrically aligned with the inner tank 16 is a vertical, open-ended vent pipe 18. This pipe is held in place by attachment to the outlet pipe 12 that extends out through the walls of the tanks 16 and 14. The vertical pipe is open at both its top and bottom ends. The lower pipe opening 36 serves as the outlet control for all of the water passing through the apparatus. The upper pipe opening 38 is the air vent for the system. This vent negates the Venturi or siphoning effect that might otherwise be occurring within the apparatus. This vent also can be restricted allowing greater flow regulation in an off-line system application.

About three-quarters vertically up the length of the pipe 18 is the attachment to the outlet pipe 12. The discharge exits the system separated from floatable solids on the surface of the stormwater.

Figure 3:
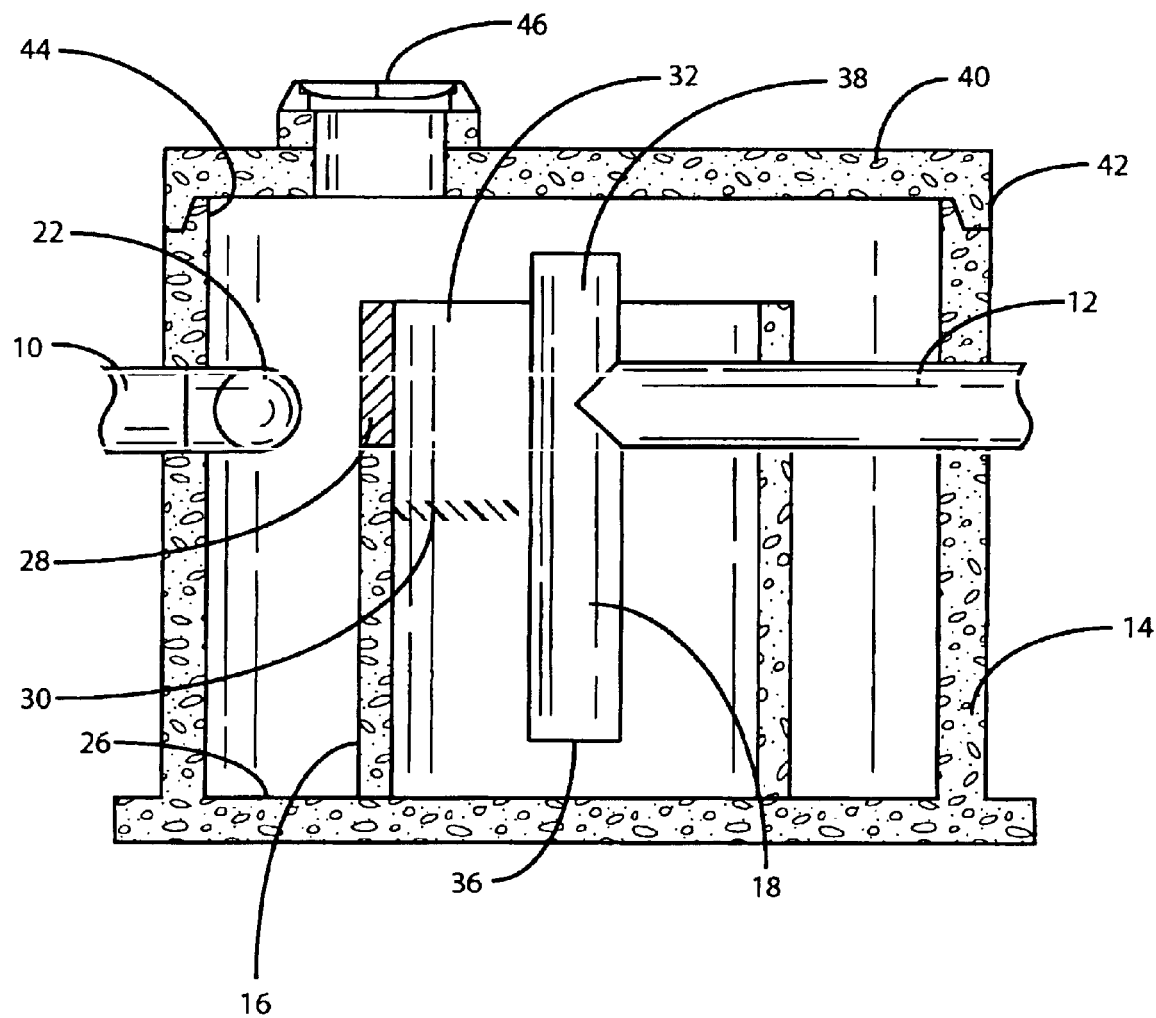
FIG. 3 is a side view cross-section of the stormwater treatment system of the present invention.

Also seen in FIG. 3 is the top cover 40 of the tank. This cylindrical lid has a circular lip 42 on the downward facing side that merges with the rim 44 surrounding the outer tank wall 14. The top cover 40 also contains a manhole passageway 46 in the top of the system which allows access from surface for maintenance.

Now that the details of the mechanical construction of the present invention have been described, consideration will next be given to its several modes of operation depending on precipitation intensity.

Figure 4:
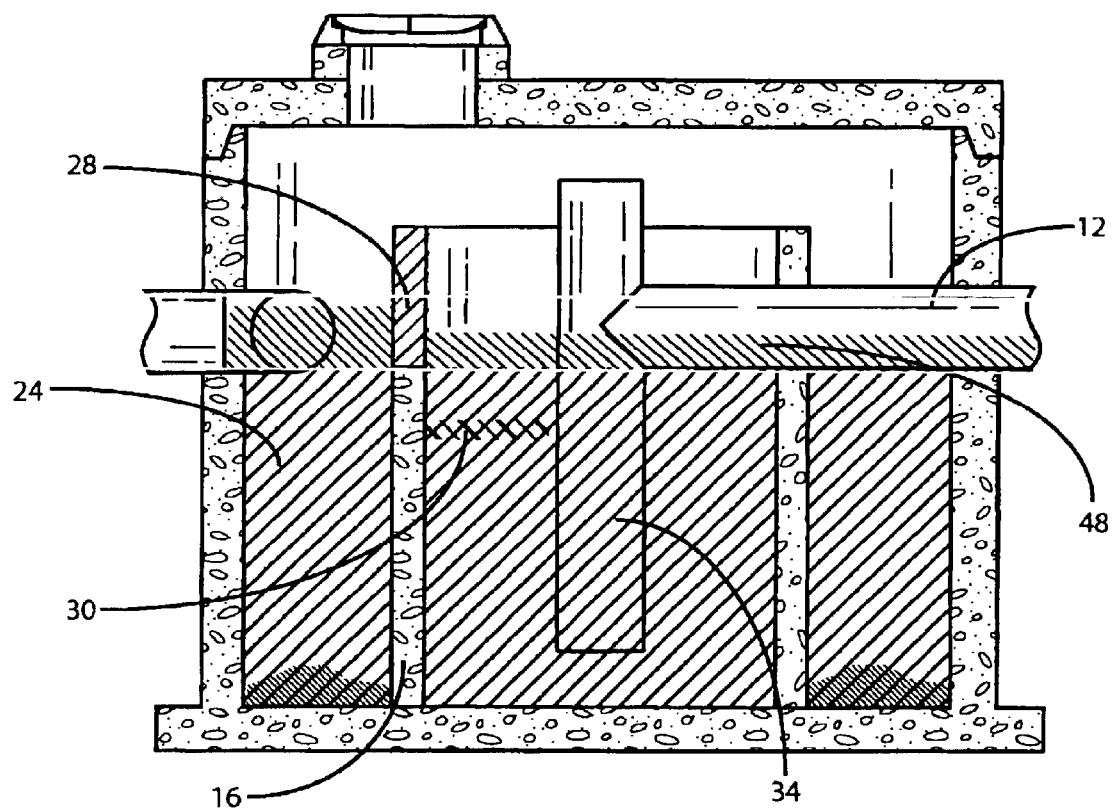
FIG. 4 is a side view cross-section of the stormwater treatment system of the present invention for a routine storm event.

FIG. 4 shows the stormwater treatment system during a routine, low intensity, storm event. In this case, rainfall is conveyed down from the ground level grates through the inlet pipe 10 and out the pipe bend 22. The rainfall has generated sufficient energy to transport liquid pollutants, liter, and contaminated particles including light sand to the outer chamber 24 of the tank. The design of the pipe bend 22 causes the stormwater to swirl in a counter clockwise direction in a slow rotation. The system is sized so that the stormwater is introduced and rotated at a flowrate that will allow enough detention time in the apparatus to achieve separation for both floating contaminants 48 and settling contaminants 50. Settling contaminants 50 drift to the bottom of the tank and are stored in the outer chamber 24. Floating debris and contaminants 48 rise and are present at the top of the water's surface.

If the precipitation continues long enough, the stormwater enters the inner tank 16 through vertical weir 28 (and horizontal weir 30, if present) when the water level reaches the predetermined height of the weir(s). There generally will be a lower liquid level within the inner tank 16. This liquid level differential is a design function of the height and area of the weir because of its tendency to restrict flow into the inner chamber 32. Ultimately, stormwater flows up through vertical pipe 34 and out the outlet pipe 12.

Figure 5:
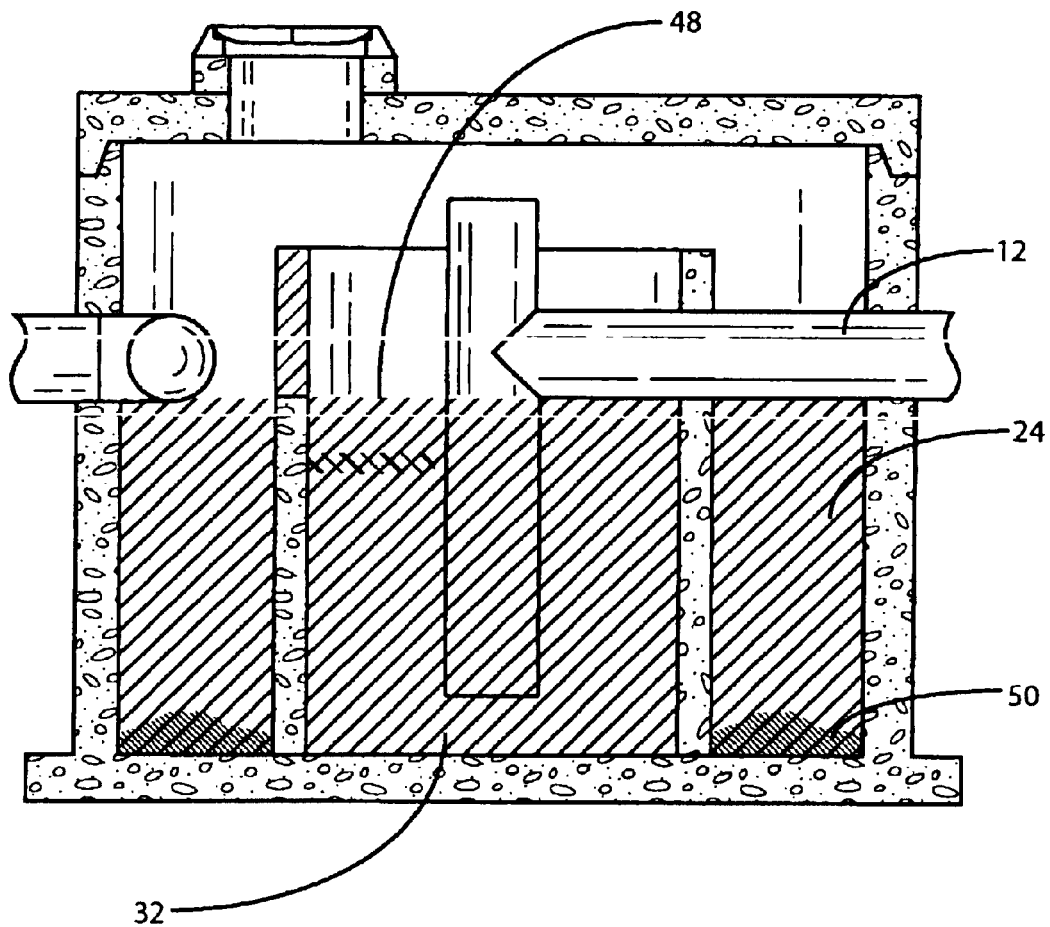
FIG. 5 is a side view cross-section of the stormwater treatment system of the present invention for a static system.

FIG. 5 shows the stormwater treatment system in a state known as a static system. This occurs during periods of dry weather. The apparatus contains a volume of stormwater determined by the elevation of the outlet pipe 12. The extended period allowed for settling of the stormwater caused the contaminates to be distinctly separated. At the water's surface is floating debris and pollutants 48 such as oil. Solids 50 precipitated out and are stored and maintained in the solids collection sump located at the bottom of outer chamber 24. If there is a horizontal weir, then it will typically be submerged in this situation.

Figure 6:
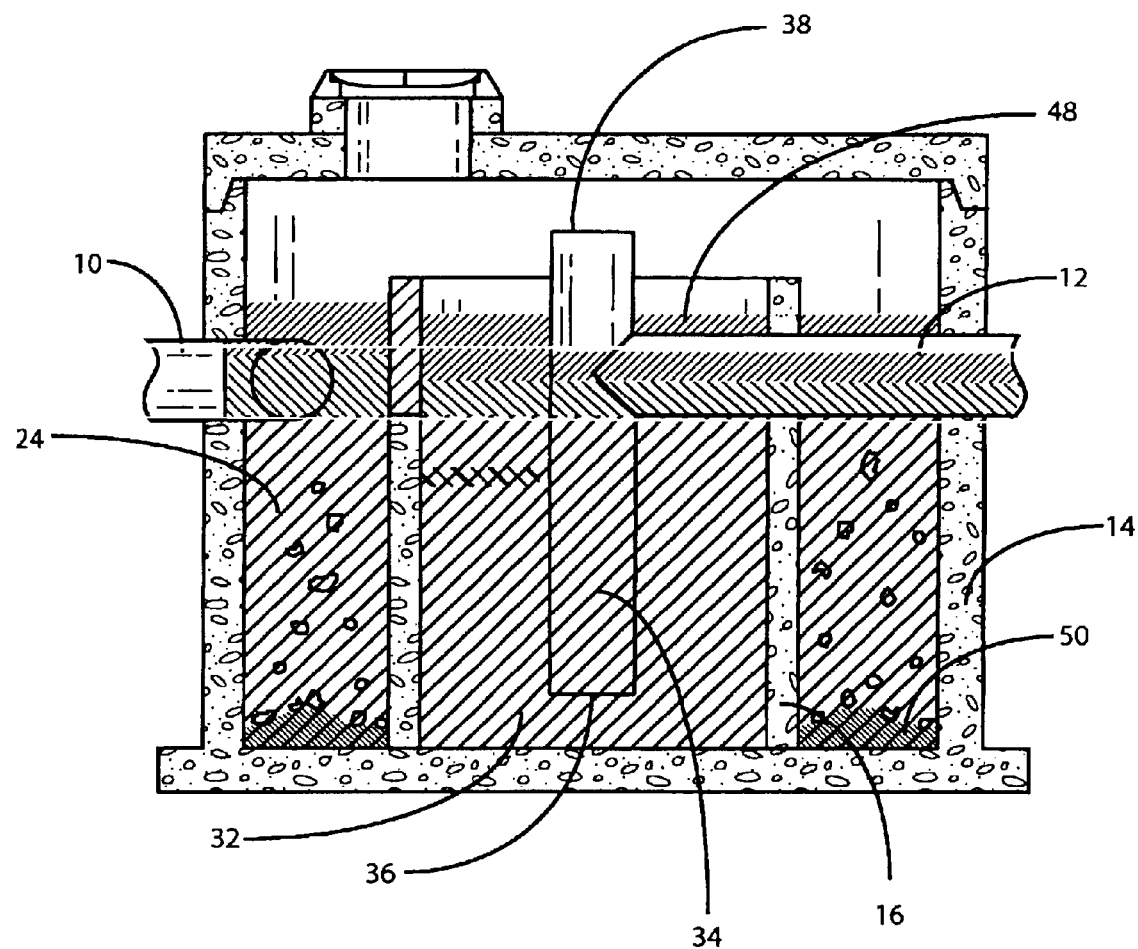
FIG. 6 is a side view cross-section of the stormwater treatment system of the present invention for an intensified storm event.

As seen in FIG. 6, the system is shown under the conditions of an intensified storm event. As a routine rainfall event increases in intensity, water continues to rise in the outer chamber 24, the inner chamber 32, and in the outlet pipe 12. As the water elevations simultaneously increase, three distinct liquid levels develop within the system. When storms generate additional intensity, the increased energy allows the storm water runoff to transport larger, heavier materials 50 with settling velocities that allow separation time to decrease as flowrate increases. Typically any floating pollutants and debris 48 were conveyed at routine storm flow. The captured floating pollutants and debris 48 rise with the internal liquid level.

Figure 7:
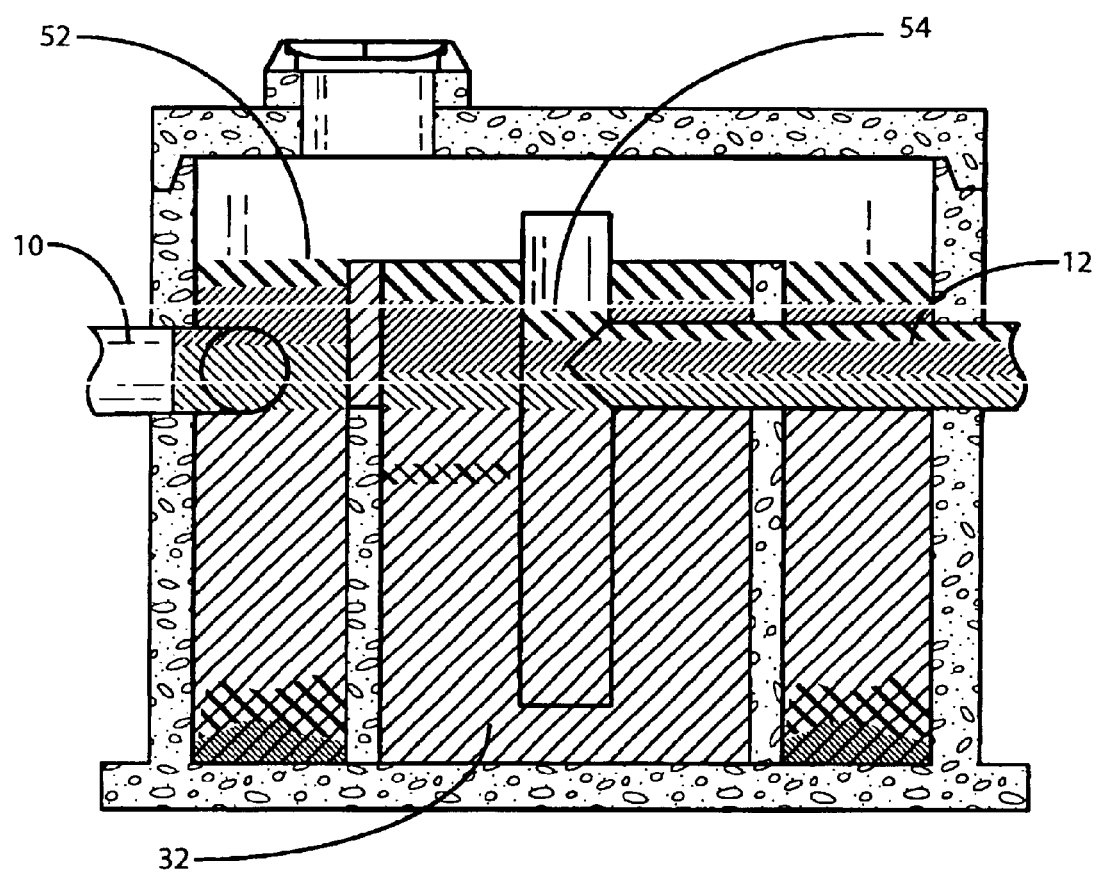
FIG. 7 is a side view cross-section of the stormwater treatment system of the present invention for a "design storm"

FIG. 7 shows a situation known as a "design storm". The "design storms" is a rainfall event that when achieved, has already flushed the pollutant load to the apparatus. Therefore the separated target pollutant are segregated from the stormwater energy and flowrates associated with the theoretical assumption that the rainwater flowing through the apparatus has little or no pollutant at this point. The liquid levels for both the outer chamber 24 and the inner chamber 32 are approximately the same. Therefore the only two liquid levels remain at 52 and 54. The outlet pipe 12 flows full. This state is reached when the flowrates at a specific site are regulated by proper weir design.

Figure 8:
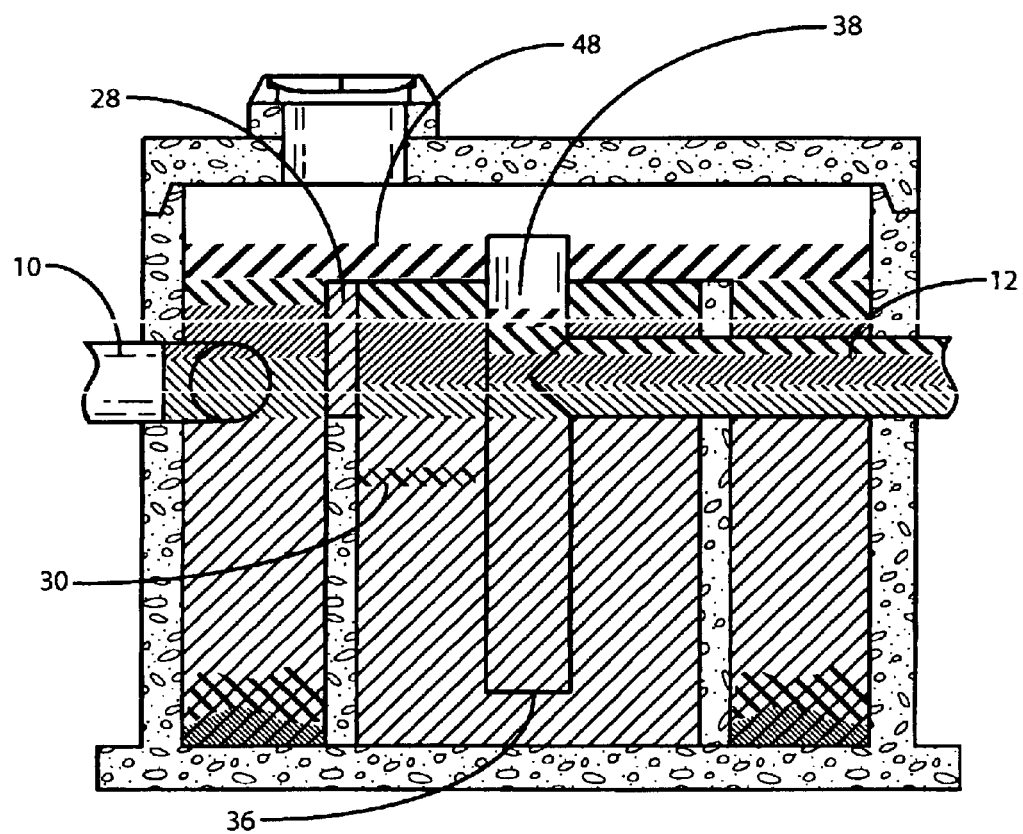
FIG. 8 is a side view cross-section of the stormwater treatment system of the present invention at peak storm design.

FIG. 8 shows the present invention at peak storm design stage. This produces the maximum flowrate of stormwater volume each component is hydraulically sized to handle. Hydraulic sizing at individual project sites enable an accurate prediction of the highest level of liquid within the apparatus. The upper pipe opening 38 is always at a level greater than the elevation of the inner chamber 32 and outer chamber 24 that produces the maximum design flowrate. Pollutants 48 and 50, that were introduced and separated at lower storm flows, are maintained within the apparatus. The weirs 28 and 30 and lower and upper pipe openings 36 and 38 maintain the pollutant location and prevent re-suspension and discharge of what the apparatus has accumulated in pollutants 48 and 50.

Figure 9:
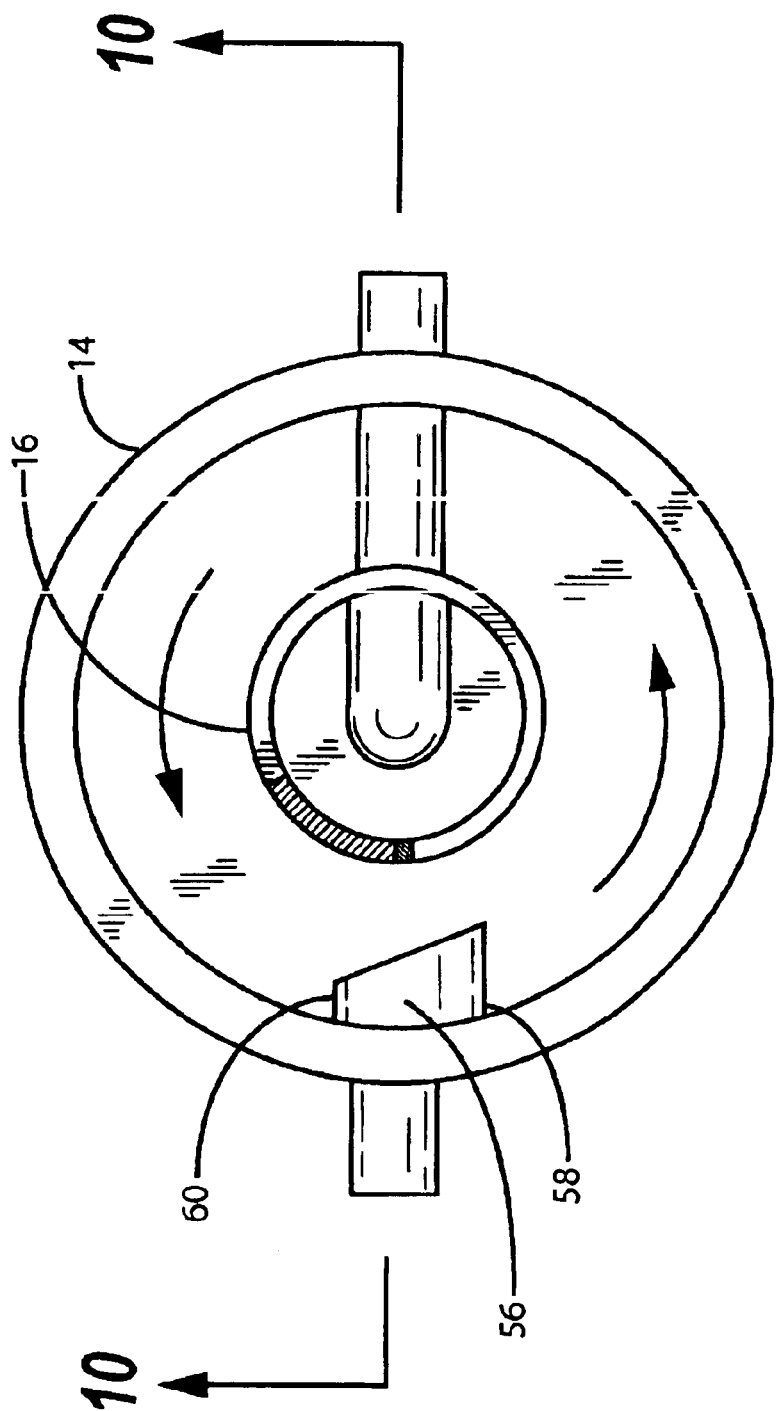
FIG. 9 is a top view of the preferred embodiment having an inlet deflector in place of an angled elbow.
Figure 10:
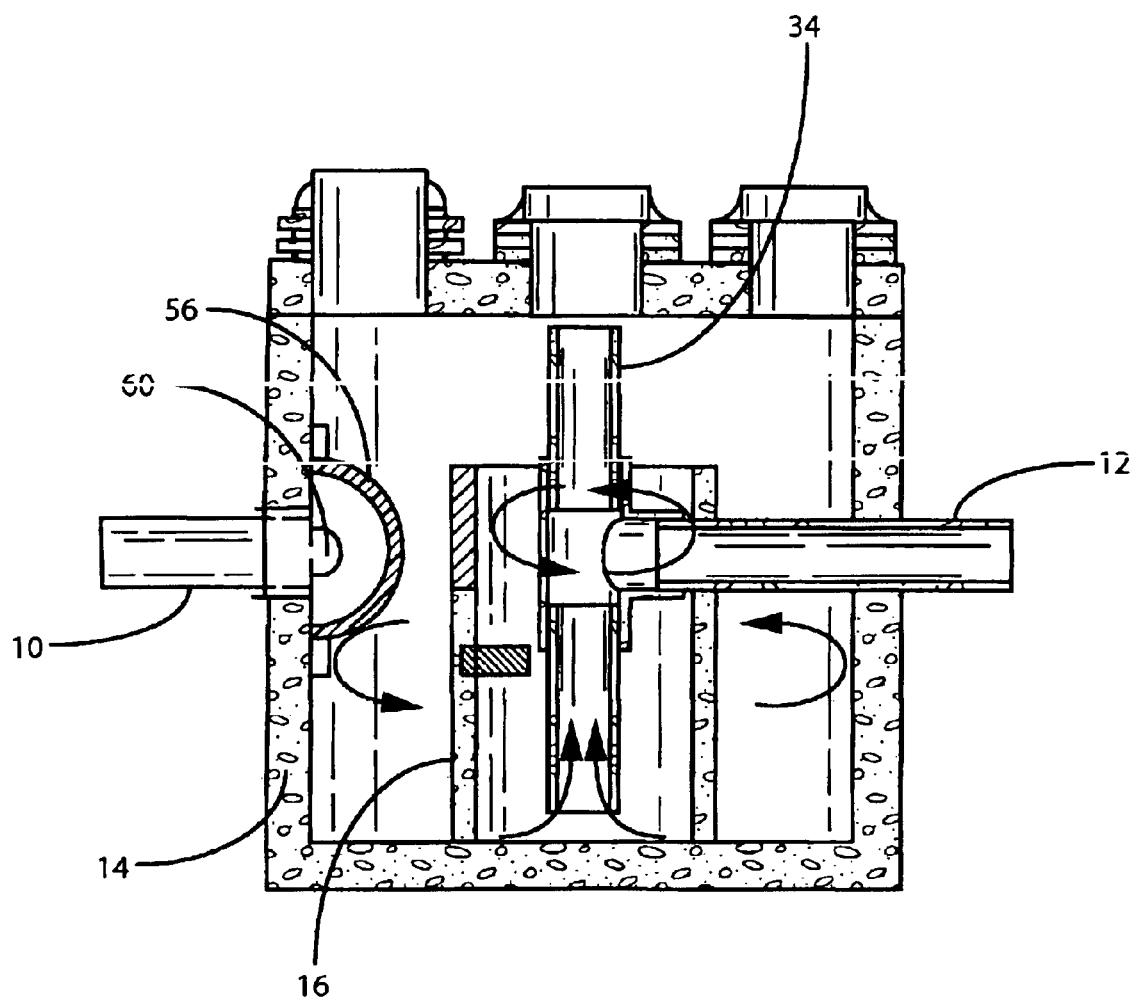
FIG. 10 is a sectional view along the line 10—10 in FIG. 9.

Referring now to the embodiment of FIGS. 9 and 10, instead of having an angled elbow at the terminus of the inlet pipe 10, a cowl like diverter 56 is used in place thereof. The function of the diverter 56 is to direct incoming stormwater in either a clockwise or counterclockwise direction in the chamber defined between the outer tank 14 and the inner tank 16 where solids are to be collected. The diverter 56 has openings of differing size at opposed end 58 and 60 thereof. The larger of the two holes determines the direction that the swirl will take. The smaller of the two holes 58 and 60 is located 180° from the larger aperture. As stormwater enters the outer tank through inlet pipe 10, the majority of the flow is deflected out the larger aperture by the diverter 56 to create a flow in the direction of the arrows in FIG. 9. Because of wall friction offered by the inside wall of the outer tank 14, the circular or swirl flow energy is reduced, thereby re-circulating a reduced flow rate back through the smaller aperture 60. The re-introduction of the controlled swirl flow pattern back through the diverter reduces the inlet thrust and helps maintain a controlled laminar flow within the separation vessel.

It can be seen, then, that the present invention provides an improved, reliable and efficient apparatus for separating pollutants, liter, and solid contamination from stormwater drainage discharge. The result is that there is an efficient drainage system that is not hampered by clogging impediments that slow storm water flow rate.

This invention has been defined herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. A stormwater treatment system for eliminating solid debris and pollutants from drainage discharge comprising, in combination:
    (a) a cylindrical vessel having a closed base adapted to be buried underground;
    (b) an inner cylindrical wall, contained within the cylindrical vessel, and protruding upward from the vessel's closed base forming an outer annular chamber and an inner cylindrical chamber;
    (c) an inlet pipe extending through the wall of the cylindrical vessel for directing stormwater from the ground surface into the outer chamber and discharging the stormwater at a predetermined angle to an axis of the inlet pipe;
    (d) a vertical pipe, contained within the inner cylindrical chamber and cylindrical vessel, said vertical pipe being open at opposed ends;
    (e) an outlet pipe extending through the wall of the cylindrical vessel at a position diametrically opposed to the inlet pipe and further extending through the inner cylindrical wall to form a Tee with the vertical pipe; and
    (f) at least one weir opening formed through the inner cylindrical wall at a predetermined height above the closed base.

2. The stormwater treatment system for eliminating solid debris and pollutants from drainage discharge, as in claim 1, wherein the predetermined angle is in a range of from about 45 to 90 and is in a generally horizontal plane.

3. The stormwater treatment system for eliminating solid debris and pollutants from drainage discharge as in claim 1 wherein at least one weir opening is a vertical slot.

4. The stormwater treatment system for eliminating solid debris and pollutants from drainage discharge as in claim 3 and further including an additional horizontal weir opening.

5. The stormwater treatment system for eliminating solid debris and pollutants from drainage discharge as in claim 4 wherein the horizontal weir is at a lower elevation than the inlet pipe, the outlet pipe, and a bottom end of the vertical slot relative to the closed base.

6. The stormwater treatment system for eliminating solid debris and pollutants from drainage discharge as in claim 1 wherein the inlet pipe, the outlet pipe and at least one opening are at the same elevation relative to the closed base.

7. A method for separating and eliminating solid debris from stormwater in a sewer system comprising the steps of:
    (a) burying an outer cylindrical tank beneath the surface of the ground, said outer tank having a closed base supporting a concentrically disposed cylindrical wall to define an outer annular chamber and an inner cylindrical chamber said cylindrical wall having a weir opening formed through it at a first predetermined elevation about said base;
    (b) providing a stormwater inlet pipe extending through the outer cylindrical tank leading to the annular chamber, the inlet pipe being in fluid communication with sewer inlet openings at ground surface and entering the outer cylindrical tank at said first predetermined elevation above the closed base;
    (c) providing an outlet pipe that leads from the cylindrical chamber, through the cylindrical wall and through the outer cylindrical tank at said first predetermined elevation, the outlet pipe being connected to a vertically disposed vent pipe disposed in the cylindrical chamber and having an upper open end at an elevation above that of said cylindrical wall and a lower open end at a second predetermined elevation less than the first predetermined elevation; and
    (d) allowing gravity to flow stormwater through the inlet pipe and around the annular chamber until the stormwater level in the annular chamber reaches the first predetermined elevation to flow through the weir opening into the cylindrical chamber, thereby increasing the settling time for solids present in the stormwater.

8. The method of claim 7 and further extending the settling time for solids circulating in the annular chamber by the time required for stormwater passing through
the weir to exit the cylindrical tank by way of the vent pipe and outlet pipe.

* * * * *